United States Patent [19]

Ohya

[11] Patent Number: 5,137,325

[45] Date of Patent: Aug. 11, 1992

[54] SIDE DOOR APPARATUS FOR VEHICLE

[75] Inventor: Takeji Ohya, Hiroshima, Japan

[73] Assignee: Mazda Motor Corporation, Hiroshima, Japan

[21] Appl. No.: 855,450

[22] Filed: Mar. 19, 1992

Related U.S. Application Data

[63] Continuation of Ser. No. 693,953, Apr. 29, 1991, abandoned.

[30] Foreign Application Priority Data

May 1, 1990 [JP] Japan .................................. 2-46956
Apr. 18, 1991 [JP] Japan .................................. 3-26337

[51] Int. Cl.⁵ ................................................ B60J 5/04
[52] U.S. Cl. .................................. 296/188; 296/189;
                                                    296/146; 49/502
[58] Field of Search ................... 296/189, 188, 146;
                                                    49/502, 503

[56] References Cited

U.S. PATENT DOCUMENTS

| | | | |
|---|---|---|---|
| 2,200,555 | 5/1940 | Krogh | 49/502 |
| 3,718,364 | 2/1973 | Fischer et al. | 296/189 |
| 3,782,036 | 1/1974 | Clark et al. | 49/502 |
| 4,013,317 | 3/1977 | Reidelbach | 296/188 X |
| 4,434,580 | 3/1984 | Engelsberger | 49/502 |

FOREIGN PATENT DOCUMENTS

| | | | |
|---|---|---|---|
| 0257608 | 3/1988 | European Pat. Off. | 49/502 |
| 1480089 | 8/1969 | Fed. Rep. of Germany | 49/502 |
| 2364632 | 8/1974 | Fed. Rep. of Germany | 296/188 |

Primary Examiner—Dennis H. Pedder
Attorney, Agent, or Firm—Price, Heneveld, Cooper, DeWitt & Litton

[57] ABSTRACT

This invention relates to a side door structure for a vehicle, consisting of front and rear doors. The side door structure includes a front impact bar disposed in the front door, and extending in the back-and-forth direction of a vehicle body, and a rear impact bar which is disposed in the rear door to be inclined obliquely upward toward the rear portion of the vehicle body, and can be in contact with a rear portion of the front impact bar while being offset vertically when the rear door is moved forward.

14 Claims, 7 Drawing Sheets

SIDE DOOR APPARATUS FOR VEHICLE

This is a continuation of application Ser. No. 07/693,953 filed on Apr. 29, 1991 now abandoned.

BACKGROUND OF THE INVENTION

The present invention relates to a side door structure for a vehicle, which structure consists of front and rear doors and, more particularly, to a side door structure for a vehicle, which can improve safety in the case of a rear or side collision.

As a conventional side door structure for a vehicle, which can improve safety against a collision from a side of a vehicle (i.e., a side collision), the following technique is known. More specifically, as described in, e.g., Japanese Patent Publication No. 6323004, an impact bar (door guard bar) extending in the back-and-forth direction of a vehicle body is arranged in each of front and rear doors constituting side doors of a sedan type vehicle, and a collision energy acting on each side door is absorbed by the impact bar.

In the conventional side door structure for a vehicle, which comprises the impact bars, since the rigidity of each of the front and rear doors is increased, a deformation of the side doors can be minimized in a side collision of the vehicle. However, when a collision from the rear side of the vehicle (i.e., a rear collision) occurs, the rear doors are moved forward since they are pushed by rear fenders deformed by the rear collision, and opposing portions between the front and rear doors may crush each other. In this manner, when the front edge portion of the rear door is deformed to cover the rear edge portion of the front door, a so-called dead lock phenomenon in which the front doors are difficult to be opened/closed, occurs.

The following countermeasures in terms of the layout of a vehicle structure may be taken. For example, the front edge of the rear door and the rear edge of the front door may be sufficiently separated in the back-and-forth direction of a vehicle body, or the front edge of the rear door may be assembled to be originally displaced inwardly from the rear edge of the front door. However, such countermeasures cause a poor outer appearance of the vehicle body, and may decrease the purchasing will of consumers. In addition, these countermeasures narrow the space of a rear passenger room, thus posing a problem of comfort for passengers seating on the rear seats Thus, these countermeasures cannot be taken.

For this reason, in order to prevent the dead lock phenomenon, a guide mechanism for guiding the front edge portion of the rear door inwardly in the vehicle body upon a rear collision, so that the front edge of the rear door does not overlap the rear edge of the front door must be arranged. However, when the guide mechanism is adopted, the side door structure is complicated, and the weight of the vehicle is undesirably increased due to the weight of the guide mechanism.

In the above-mentioned reference, each impact bar is arranged at the same level as a bumper of a colliding vehicle. As a result, the position of the impact bar corresponds to the waist position of a seating passenger. In some cases, the shock of the collision cannot be absorbed by the impact bar depending on collision levels. In this case, the impact bar may enter the passenger room, and may hit the waist of a seating passenger.

SUMMARY OF THE INVENTION

The present invention has been made in consideration of the conventional problems, and has as its principal object to provide a side door structure for a vehicle, which can prevent the dead lock phenomenon, i.e., can prevent the front edge portion of a rear door from overlapping the rear edge portion of a front door in a rear collision state without arranging a guide mechanism for guiding the front edge portion of the rear door inwardly in the vehicle body.

It is another object of the present invention to provide a side door structure for a vehicle, which can maintain front doors to be openable in a rear collision state without increasing the weight of the vehicle.

It is still another object of the present invention to provide a side door structure for a vehicle, which can improve safety of passengers against a side collision.

In order to solve the conventional problems, and to achieve the above objects, a side door structure for a vehicle, according to one aspect of the present invention, comprises a front door disposed on a front portion, a rear door disposed on a rear portion, a front impact bar disposed in the front door, and extending in a back-and-forth direction of a vehicle body, and a rear impact bar which is disposed in the rear door to be inclined obliquely upward toward the rear portion of the vehicle body, and can be in contact with a rear portion of the front impact bar while being offset vertically when the rear door is moved forward.

Since the side door structure for the vehicle according to the present invention is arranged in this manner, when a force for pushing a rear door toward the front side of the vehicle body acts in a rear collision state of the vehicle, the rear impact bar abuts against the front impact bar, and is rotated about its front edge portion in a direction to increase an inclination angle. As a result, the lower portion of the front edge of the rear door, which portion opposes the rear edge of the front door, is separated from the front door.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A side door structure for a vehicle according to an embodiment of the present invention will be described hereinafter with reference to the accompanying drawings. In this case, the present invention is applied to a sedan type vehicle.

Figure 1:
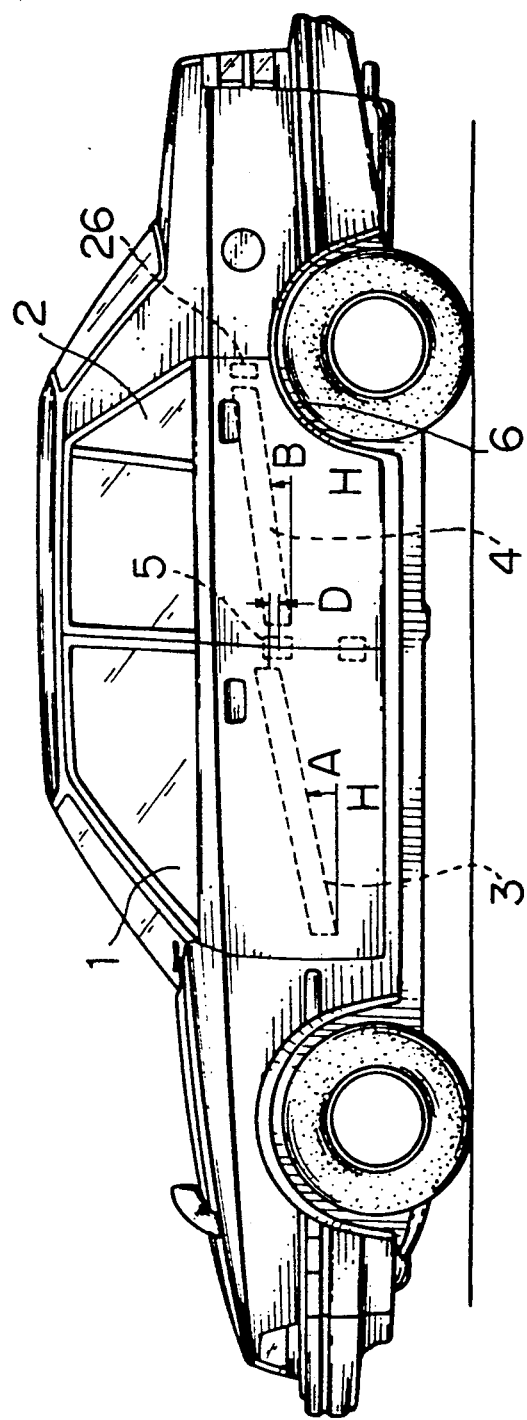
FIG. 1 is a schematic side view showing a vehicle comprising a side door structure for a vehicle according to an embodiment of the present invention.

As shown in FIG. 1, side doors of this embodiment consist of front and rear doors 1 and 2, and have the same structure on the right and left sides of a vehicle body. For this reason, only the right side door structure will be described below, and a description of the left side door structure will be omitted. The front and rear doors 1 and 2 are mounted, so that the rear edge of the front door 1 and the front edge of the rear door 2 face each other to be adjacent to each other in the same plane. Thus, the outer appearance of the vehicle body looks smooth.

Impact bars 3 and 4 which extend in the back-and-forth direction of the vehicle body are respectively mounted in the front and rear doors 1 and 2. The impact bar 3 is disposed in the front door 1 to be inclined obliquely upward toward the rear portion of the vehicle body at an angle A with respect to a horizontal axis H extending in the back and-forth direction of the vehicle body. More specifically, the front end portion of the impact bar 3 is mounted at a level where a load is input in a side collision, i.e., where the bumper of another vehicle collides with high possibility. The rear end portion of the impact bar 3 is mounted at a position immediately before a portion where a door hinge 5 for pivotally mounting the rear door 2 on a center pillar 13 (FIG. 3) is arranged, so as to be mounted at a level higher by a predetermined height than the front end portion.

The impact bar 4 is disposed in the rear door 2 to be inclined obliquely upward toward the rear portion of the vehicle body at an angle B with respect to the above-mentioned horizontal axis H. More specifically, the angle B is smaller than the inclination angle A of the front impact bar 3 described above. The front end portion of the impact bar 4 is mounted to be offset downward from the rear end portion of the impact bar 3 disposed in the front door 1. The rear end portion of the impact bar 4 is mounted at a level higher by a predetermined height than the front end portion, e.g., is mounted at a position above a tire house 6 in this embodiment.

The front end portion of the rear impact bar 4 is offset downward from the rear end portion of the front impact bar 3 to partially overlap each other by a distance D in the direction of height, as shown in FIG. 1. In other words, the upper portion of the front end portion of the rear impact bar 4 opposes the lower portion of the rear end portion of the front impact bar 3 in the horizontal direction, and when the rear impact bar 4 is moved forward, at least a portion (i.e., by the distance D) of its front end portion can abut against the rear end portion of the front impact bar 3 via, e.g., the center pillar 13.

Figure 2:
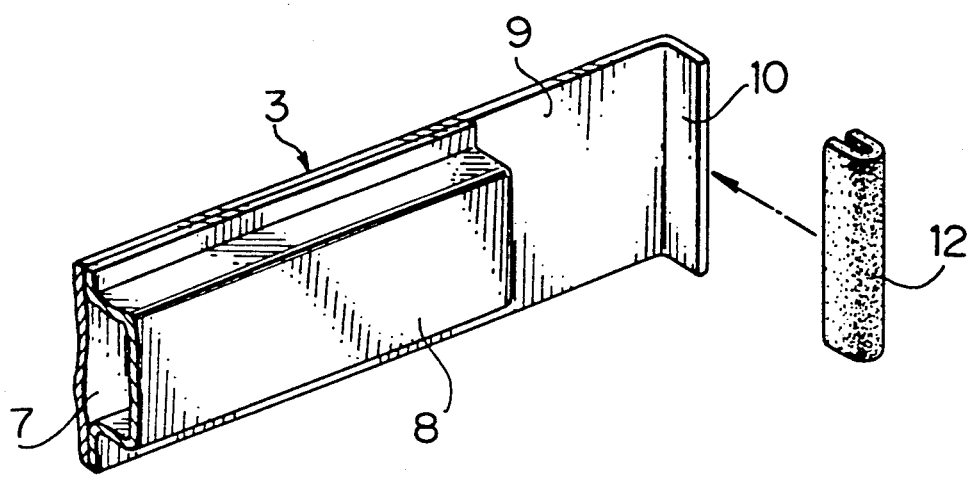
FIG. 2 is a perspective view of a structure of an impact bar.
Figure 3:
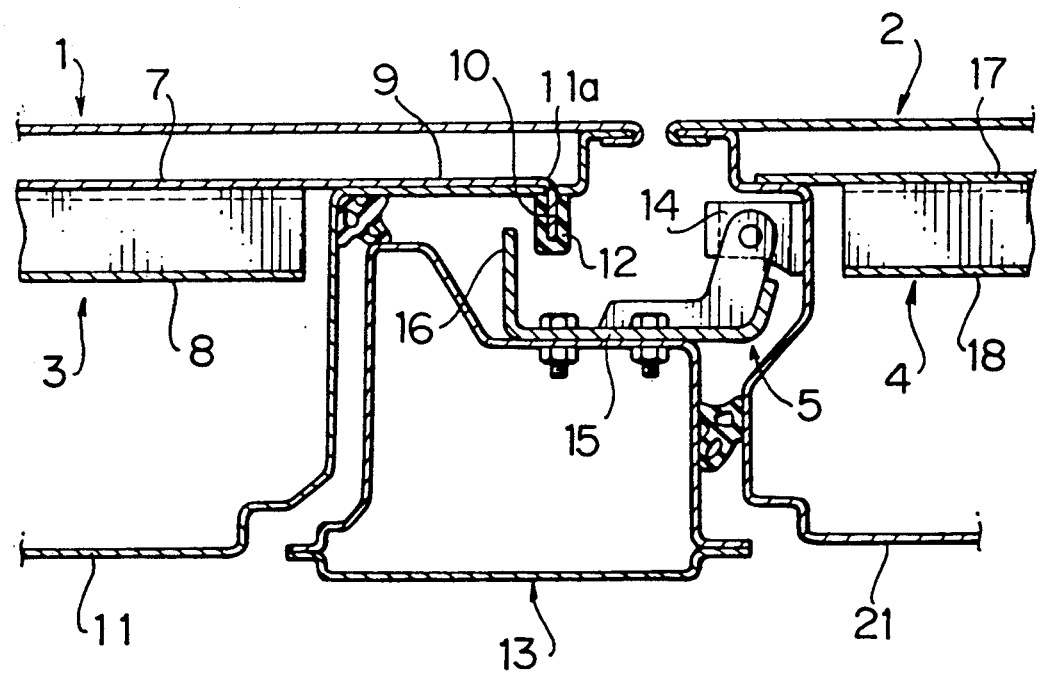
FIG. 3 is a sectional view showing a structure of a rear edge portion of a front door.

The impact bar 3 disposed in the front door 1 comprises a plate member 7 located on the outer side of the vehicle body, and a beam member 8 which has a U-shaped section, and is joined to the inner wall surface on the passenger room side of the plate member 7 to define a closed section between itself and the plate member 7, as shown in FIGS. 2 and 3. Since the impact bar 3 is arranged to define the closed section, as described above, it can maintain very high flexural rigidity. An extending portion 9 extending toward the rear portion of the vehicle body is integrally formed on the rear portion of the plate member 7, and a hook 10 projecting to be bent toward the passenger room side is formed on the rear edge of the extending portion 9.

An opening 11a for receiving the hook 10 of the impact bar 3 is formed in an inner panel 11 of the front door 1. The inner wall surface of the extending portion 9 is fixed to the outer wall surface of the inner panel 11 by welding or by bolts in such a manner that the hook 10 extends outwardly from the front door 1 via the opening 11a. Note that a protector 12 formed of plastic or synthetic rubber is mounted on the end portion of the hook 10, which portion extends outside the front door 1. The protector 12 protects a passenger from being injured by the extending end portion of the hook 10 when he or she touches the end portion.

Figure 4:
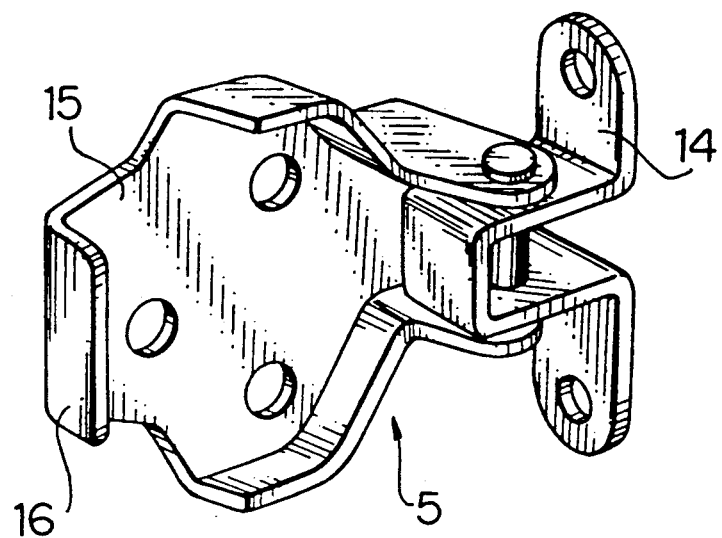
FIG. 4 is a sectional view showing a structure of a door hinge.

The door hinge 5 for the rear door 2 is mounted on a wall surface portion of the center pillar 13, which portion opposes the rear end portion of the impact bar 3. More specifically, as shown in FIG. 4, the door hinge 5 is constituted by a mounting board 15 firmly fixed to the center pillar 13 via, e.g., bolts, and a rotary bracket 14 which is pivotally supported about the vertical axis at the rear portion of the mounting board 15, and is fixed to the front end face of the rear door 2. A locking segment 16 which is bent toward outside the vehicle body is integrally formed at the front edge of the mounting board 15. The rear surface of the locking segment 16 opposes the front surface of the hook 10 of the impact bar 3 in the back and-forth direction of the vehicle body when the front door 1 is closed. In other words, when the impact bar 3 is displaced forward, the hook 10 is engaged with the locking segment 16, thus regulating the forward displacement of the impact bar 3.

Figure 5:
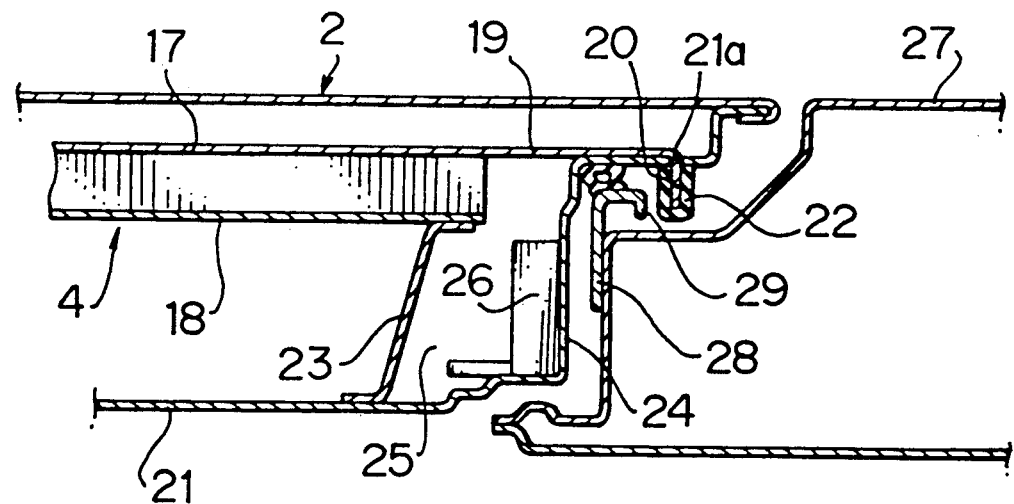
FIG. 5 is a sectional view showing a structure of a rear edge portion of a rear door.

The impact bar 4 disposed in the rear door 2 comprises a plate member 17, and a beam member 18 which are arranged in the same manner as the impact bar 3 disposed in the front door 1, as shown in FIG. 5. An extending portion 19 extending toward the rear portion of the vehicle body is integrally formed on the rear portion of the plate member 17, and a hook 20 projecting to be bend toward the passenger room is formed on the rear edge portion of the extending portion 19. The front edge portion of the plate member 17 is fixed to the outer wall surface of an inner panel 21 of the rear door 2 by spot welding, as shown in FIG. 3. An opening 21a for receiving the hook 20 of the impact bar 4 is formed in the inner panel 21 of the rear door 2. The inner wall surface of the extending portion 19 is fixed to the outer wall surface of the inner panel 21 by welding or by bolts in such a manner that the hook 20 extends outwardly from the rear door 2 via the opening 21a. Note that a protector 22 formed of plastic or synthetic rubber is mounted on the end portion of the hook 20, which portion extends outside the rear door 2. The protector 22 protects a passenger from being injured by the extending end portion of the hook 20 when he or she touches the end portion.

The inner wall surface of the rear end portion of the beam member 18 is coupled to the outer wall surface of the inner panel 21 via a coupling bracket 23. The extending portion 19, the coupling bracket 23, and a rear wall portion 24 of the inner panel 21 define a closed section 25. A door lock mechanism 26 of the rear door 2 is disposed in the closed section 25 formed in this manner. Since the door lock mechanism 26 has a known structure, a detailed description thereof will be omitted here.

A seal bracket 28 for mounting a seal member is firmly mounted on the front wall portion of a rear fender 27 opposing the rear end portion of the rear impact bar 4 by, e.g., welding. The outer edge of the seal bracket 28 is bent backward, and the bent segment defines a locking segment 29 which opposes the front surface of the hook 20 in the back-and-forth direction of the vehicle body in the closed state of the rear door 2. In other words, when the impact bar 4 is displaced forward, the hook 20 is engaged with the locking segment 29, thereby regulating the forward displacement of the impact bar 4.

Since the impact bar 4 is disposed in the rear door 2 in this manner, the front end portion of the bar 4 is mounted at a level where a load is input in a side collision, i.e., where the bumper of another vehicle collides with high possibility. As a result, a load input when the bumper of another vehicle collides against the rear door 2 in a side collision state of the vehicle is temporarily received by the front portion of the impact bar 4, and is then transmitted from the front portion toward the rear portion. As a result, the load is received by the entire impact bar 4. Since the impact bar 4 is inclined obliquely upward toward the rear portion of the vehicle body with respect to the horizontal axis H, and its rear end portion is arranged above the tire house 6, the rear end portion of the impact bar 4 can be prevented from directly hitting the waist of a passenger seated at the rear seat even when it is moved into the passenger room in a side collision state of the vehicle.

Since the rear fender 27 constituting the upper portion of the tire house 6 has high rigidity, a forward deformation amount of the fender 27 can be suppressed in a rear collision state of the vehicle Therefore, since the rear end portion of the impact bar 4 is arranged above the tire house 6, i.e., in front of the rear fender 27, the rear impact bar 4 can be regulated from being considerably pushed toward the front portion of the vehicle body, and the forward movement of the rear door 2 can be suppressed.

Figure 6:
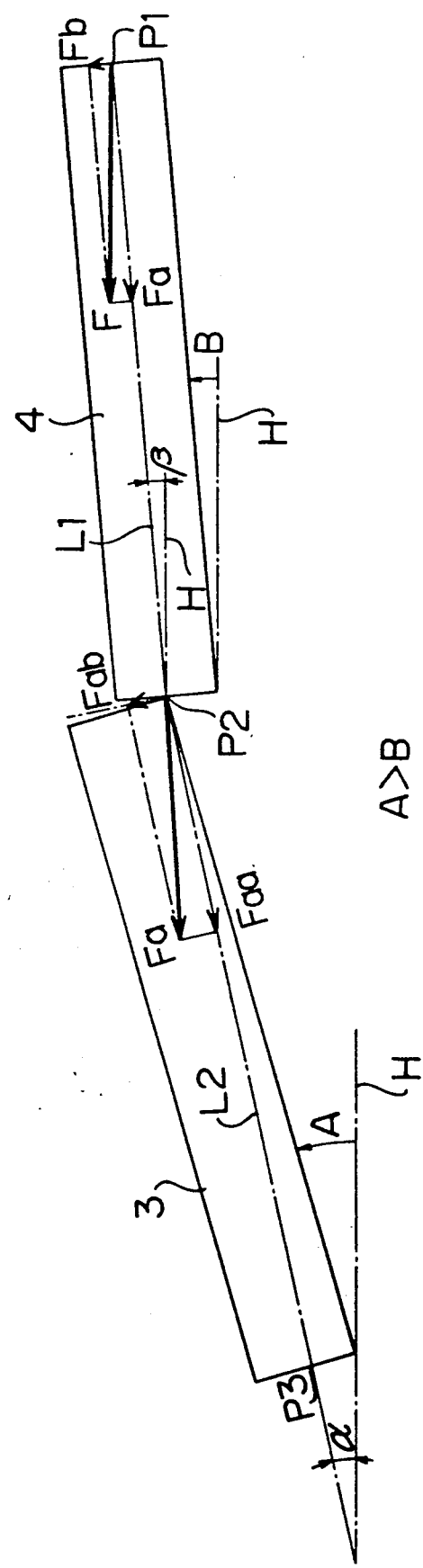
FIG. 6 is a schematic view showing a state wherein the front and rear doors are respectively rotated upon a rear collision.

Since the front end portion of the impact bar 4 disposed in the rear door 2 is offset downward from the rear end portion of the impact bar 3 of the front door 1 to overlap it by the predetermined distance D, even when a force for moving the rear door 2 forward acts upon a rear collision, the dead lock phenomenon can be prevented, i.e., the front edge portion of the rear door 2 can be prevented from overlapping the rear edge portion of the front door 1 to make an opening/closing operation of the front door 1 impossible, as will be described in detail later with reference to FIG. 6.

More specifically, assume that a pushing force F for pushing the rear door 2 horizontally acts on the rear end portion of the rear door 2 in a rear collision state of the vehicle It is also assumed that an acting point P1 of the pushing force F is at the central portion of the rear end of the rear door 2. The rear door 2 is entirely pushed forward by the pushing force F. Upon forward movement of the rear door 2 by pushing, the impact bar 4 mounted in the rear door 2 is also moved forward, and its front end portion is brought into contact with the rear end portion of the impact bar 3 at a point P2 via, e.g., the center pillar 13 (not shown).

Upon this contact, the pushing force F for moving the rear impact bar 4 forward is divided into a force component Fa along a first axis L1 connecting the acting point P1 of the pushing force F on the impact bar 4 and the contact point P2, and a force component perpendicular to the force component Fa, i.e., an upward force component Fb since the impact bar 4 is inclined obliquely upward toward the rear portion of the vehicle body, as shown in FIG. 6. In this manner, the upward partial force Fb is generated at the acting point of the force on the impact bar 4, and acts as a couple of forces having the contact point P2 between the rear and front impact bars 4 and 3 as a fulcrum. In other words, since the couple of forces Fb acts, a force for rotating the rear door 2 in a direction to increase the inclination angle B of the impact bar 4 with respect to the horizontal axis H, i.e., for rotating the rear door 2 counterclockwise in FIG. 1 about an axis extending along the widthwise direction of the vehicle body acts on the rear door 2. Since the rear door 2 is rotated upon a rear collision, the lower portion of the front edge portion of the rear door 2 constituting the opposing portion with the front door 1 is separated from the lower portion of the rear edge portion of the front door 1 by the rear collision. Therefore, the dead lock phenomenon caused by the rear collision can be essentially prevented.

The upper portion of the rear door 2 is urged against the front door 1 upon rotation of the rear door 2. However, the upper portion of the rear door 2 is constituted by a sash portion having low rigidity, and can be easily bent by the couple of forces Fb. Therefore, no deformation mode for covering the upper portion of the front door 1 occurs, and the dead lock phenomenon at the upper portion of the rear door 2 can also be prevented.

More specifically, in a conventional structure, the dead lock phenomenon caused by a rear collision causes the front edge of the rear door 2 to cover the rear edge of the front door 1 over the total length of the rear door 2. For this reason, the front door 1 cannot be opened. In this embodiment, however, the front edge of the rear door 2 is separated from the rear edge of the front door 1 in at least the lower portions of the rear and front doors 2 and 1, and the front door 1 can be easily opened in this state, thus essentially eliminating the problem caused by the dead lock phenomenon.

In the above-described embodiment, since the rear impact bar 4 is brought into contact with the front impact bar 3 upon a rear collision, the partial force Fa acts on the impact bar 3 as a forward pushing force. The acting direction of the pushing force Fa is along a second axis L2 connecting the acting point of the pushing force Fa on the rear end of the front impact bar 3, i.e., the contact point P2 of the distal end of the rear impact bar 4 and a central portion P3 of the front end of the front impact bar 3 The front edge of the front door 1, where the front end of the impact bar 3 is fixed, is firmly axially supported by a front pillar (not shown). As a result, as shown in FIG. 6, the pushing force Fa acting on the front impact bar 3 is divided into a force component Faa along the second axis L2, and a force component Fab perpendicular to the force Faa. Since an angle formed between the second axis L2 and the horizontal axis H is set to be larger than an angle $\beta$ formed between the acting direction of the pushing force Fa and the horizontal axis H, the force component Fab is defined as an upward partial force. In this manner, the upward partial force Fab is generated at the acting point P2 of the pushing force Fa on the impact bar 3, and the partial force Fab acts on the front door 1 as a force for rotating the front door 1 in a direction to increase the inclination angle A of the impact bar 3 with respect to the horizontal axis H, i.e., for rotating the door 1 counterclockwise in FIG. 1 about an axis extending along the widthwise direction of the vehicle body to have the support point P3 of the acting force on the front end portion of the front impact bar 3 as a fulcrum.

As a result, in this embodiment, when a force for pushing the front door 1 toward the front side of the vehicle body is input from the rear door 2 in a rear collision state of the vehicle, the front door 1 is rotated in the same direction as the rotational direction of the rear door 2, i.e., in a counterclockwise direction in FIG. 1 to have the front end portion of the impact bar 3 as a fulcrum. Upon rotation of the front door 1, the upper portion of the rear edge portion of the door 1 is displaced forward, thus effectively preventing the dead lock phenomenon.

Note that in FIG. 6 referred to in the above description, the inclination angle A of the front impact bar 3 with respect to the horizontal axis H is different from the inclination angle of the second axis L2, which defines the acting direction of the partial force Faa acting on the front impact bar 3, with respect to the horizontal axis H. However, in practice, since the impact bar 3 is defined as an elongated member, the above-described two inclination angles A and $\alpha$ have substantially the same value. In other words, it can be assumed that the partial force Faa acting on the front impact bar 3 acts along the extending direction of the impact bar 3.

On the other hand, in FIG. 6, the inclination angle B of the rear impact bar 4 with respect to the horizontal axis H is different from the inclination angle $\beta$ of the first axis L1, which defines the acting direction of the partial force Fa acting on the rear impact bar 4, with respect to the horizontal axis H. However, in practice, since the rear impact bar 4 is defined as an elongated member in the same manner as the front impact bar 3, the above-described two inclination angles B and $\beta$ have substantially the same value. In other words, it can be assumed that the partial force Fa acting on the rear impact bar 4 acts in the extending direction of the impact bar 4.

Therefore, as described above, a condition for rotating the front door 1 in the same direction as the rotational direction of the rear door 2, i.e., in the counterclockwise direction in FIG. 1, when the rear impact bar 4 is brought into contact with the front impact bar 3 upon a rear collision, can be reiterated that the inclination angle B of the rear impact bar 4 with respect to the horizontal axis H is smaller than the inclination angle A of the front impact bar 3 with respect to the horizontal axis H.

In the embodiment described above, as shown in FIG. 3, the bent hook 10 is provided to the extending portion 9 formed at the rear end portion of the impact bar 3 of the front door 1. The hook 10 is fixed to the inner panel 11 while projecting toward the center pillar 13, and the locking segment 16 opposing the hook 10 is fixed to the mounting board 15 of the door hinge 5. As a result, in a side collision state of a vehicle to the front door 1, the front door 1 can be effectively prevented from entering the passenger room.

More specifically, the front door 1 is axially supported by the front pillar at its front edge, and its mounting state is firmly assured However, the rear edge of the front door 1 is merely locked by the center pillar 13 via a lock mechanism (not shown). When, for example, the bumper of another vehicle collides against the front door 1, the rear edge of the front door 1 is easily disengaged from the center pillar 13, and may undesirably enter the passenger room.

In this embodiment, however, when the impact bar 3 is deformed while absorbing the collision force, and is moved toward the passenger room in a side collision state to the front door 1, the hook 10 integrally formed on the rear end of the impact bar 3 is brought into contact with the locking segment 16 of the door hinge 5 firmly fixed to the center pillar 13, and is locked by the locking segment 16. For this reason, the impact bar 3 can no longer be deformed and moved. As a result, the impact bar 3 can effectively prevent the collided front door 1 from entering the passenger room.

The rear door 2 is axially supported by the center pillar 13 at its front edge, and its mounting state is firmly assured. However, the rear edge of the rear door 2 is merely locked by the rear fender 27 via the lock mechanism 26, as shown in FIG. 5. For this reason, when, for example, the bumper of another vehicle collides against the rear door 2, the rear edge of the rear door 2 is easily disengaged from the rear fender 27, and may undesirably enter the passenger room.

In this embodiment, however, when the impact bar 4 is deformed while absorbing the collision force, and is moved toward the passenger room in a side collision state to the rear door 2, the hook 20 integrally formed at the rear end of the impact bar 4 is brought into contact with the locking segment 29 integrally formed at the seal bracket 28 firmly fixed to the rear fender 27, and is locked by the locking segment 29. For this reason, the impact bar 4 can no longer be deformed and moved. As a result, the impact bar 4 can effectively prevent the side-collided rear door 4 from entering the passenger room.

In the above-described embodiment, the bracket 23 for coupling the impact bar 4 and the inner panel 21 the extending portion 19 of the impact bar 4, and the rear wall portion 24 of the inner panel 21 form the closed section 25. The lock mechanism 26 for the rear door 2 is disposed in the closed section 25. As a result, the mechanical strength of the installation portion of the lock mechanism 26 can be reinforced by the closed section 25. Even when the rear edge portion of the rear door 2 is crushed by the rear fender 27 in a rear collision state of the vehicle, the deformation of the installation portion of the lock mechanism 26 can be effectively prevented, and the locking state can be reliably maintained.

The present invention is not limited to the structure of the above embodiment, and various changes and modifications may be made within the spirit and scope of the invention.

Figure 7:
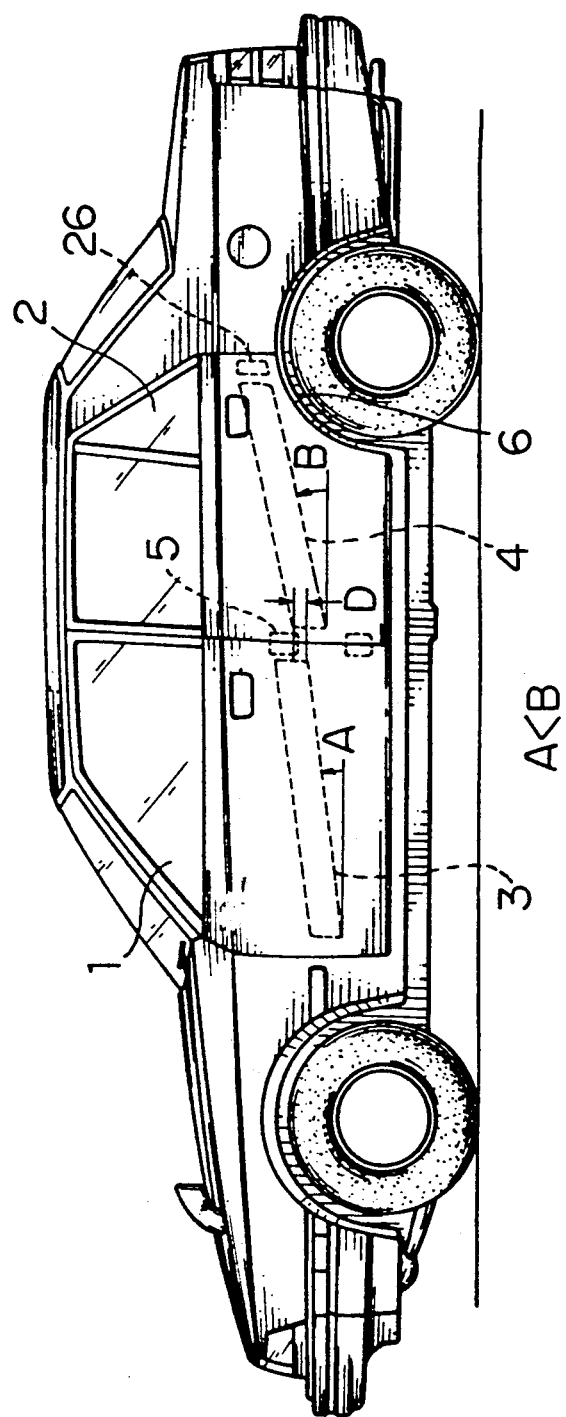
FIG. 7 is a schematic side view showing a vehicle comprising a side door structure according to the first modification of the embodiment described above.

For example, in the above embodiment, the front end portion of the rear impact bar 4 is offset downward from the rear end portion of the front impact bar 3 to partially overlap it by the distance D. However, the present invention is not limited to this structure. For example, as shown in FIG. 7 as the first modification, the front end portion of the rear impact bar 4 may be arranged to be offset downward from the rear end portion of the front impact bar 3.

Figure 8:
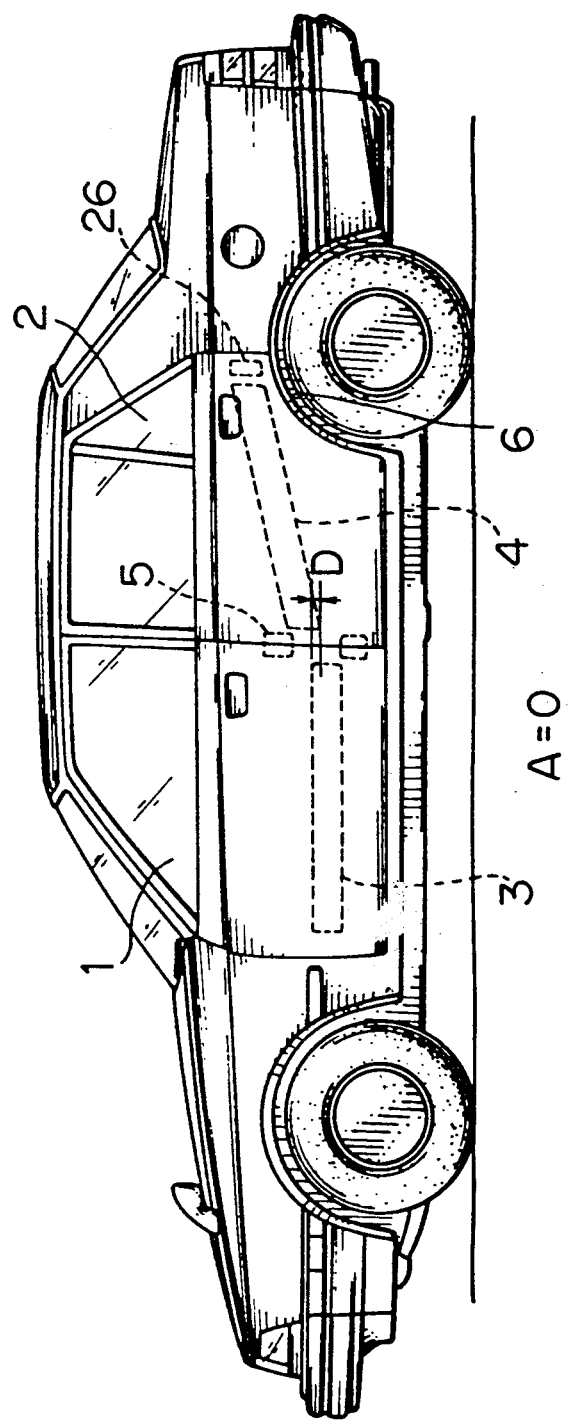
FIG. 8 is a schematic side view showing a vehicle comprising a side door structure according to the second modification of the embodiment described above.

In the above embodiment, the inclination angle B of the rear impact bar 4 with respect to the horizontal axis H is set to be larger than the inclination angle A of the front impact bar 3 with respect to the horizontal axis H. However, the present invention is not limited to this structure. The inclination angle A of the front impact bar 3 can be arbitrarily set, and may be set to be smaller than the inclination angle B of the rear impact bar 4. For example, as shown in FIG. 8 as the second modification, the impact bar 3 may be arranged in a substantially horizontal state, i e , to have the inclination angle A to be substantially zero. In this case, the impact bar 3 is arranged at a level corresponding to the level of the bumper of a vehicle colliding against a side of the vehicle.

Figure 9:
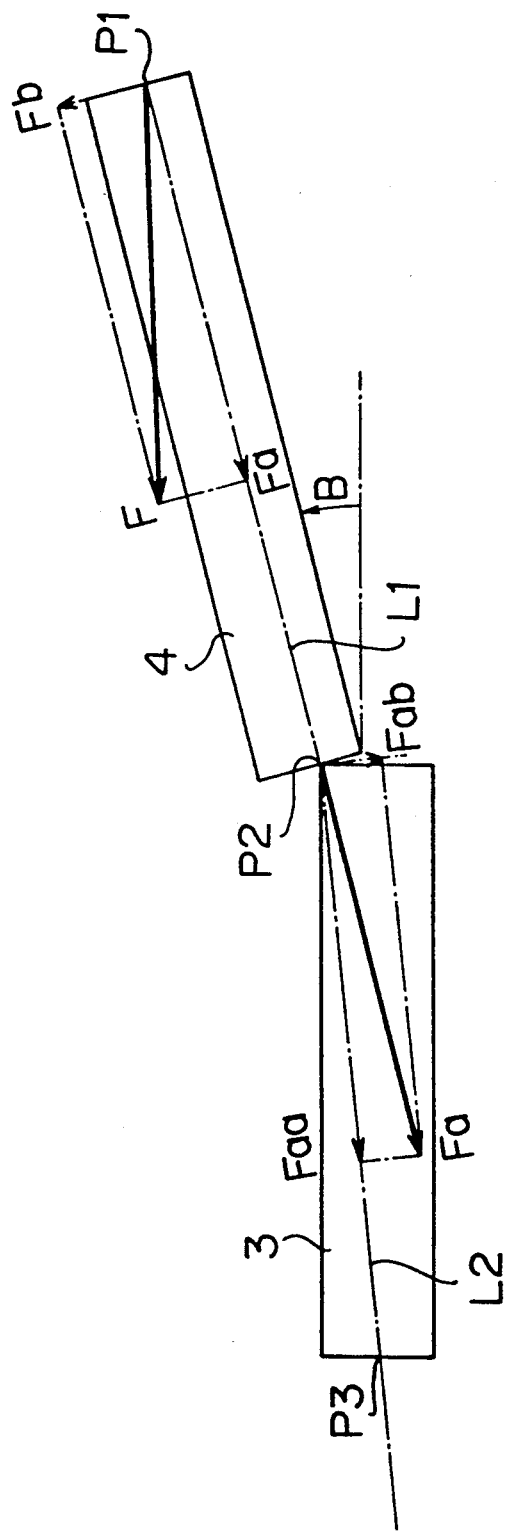
FIG. 9 is a schematic view showing a state wherein rear and front doors are respectively rotated upon a rear collision in the second modification.

When the inclination angle A of the front impact bar 3 is set to be smaller than the inclination angle B of the rear impact bar 4 like in the second modification, as shown in FIG. 9, the partial force Fab as a couple of forces for pivoting the front impact bar 3 is directed downward. As a result, in the second modification, when the rear impact bar 4 is brought into contact with the front impact bar 3 upon a rear collision, the front door 1 is rotated in a direction opposite to the rotational direction of the rear door 2, i.e., a clockwise direction in FIG. 1 Upon rotation of the front door 1, the lower portion of the rear edge portion of the front door 1 is displaced forward, and is further separated from the lower portion of the front edge portion of the rear door 2. thus more effectively preventing the dead lock phenomenon.

That is, in the present invention, the abovedescribed dead lock phenomenon can be essentially prevented as long as the rear impact bar 4 is inclined obliquely upward toward the rear portion of the vehicle body, and can be engaged with the front impact bar 3 by the forward movement caused by a rear collision. Therefore, the engaging position (state) with the front impact bar 3, and the inclination angle of the front impact bar 3 do not limit the present invention.

As many apparently widely different embodiments of the present invention can be made without departing from the spirit and scope thereof, it is to be understood that the invention is not limited to the specific embodiments thereof except as defined in the appended claims.

What is claimed is:

1. A side door structure for a vehicle, comprising:
a front door disposed on a front portion;
a rear door disposed on a rear portion;
a front impact bar disposed in said front door, and extending in a back-and-forth direction of a vehicle body; and
a rear impact bar disposed in said rear door, a central longitudinal axis of which is inclined upward toward the rear portion of the vehicle body, and on the occurrence of a rear end collision, said rear impact bar can contact said front impact bar and have the rear end of said impact bar raised vertically when said rear door is moved forward, the central axis of the rear impact bar being offset vertically from a central longitudinal axis of the front impact bar by a predetermined distance in height.

2. The structure according to claim 1, wherein said rear impact bar is positioned in said rear door with the forward end of said impact bar positioned lower than the rear end thereof.

3. The structure according to claim 1, wherein said front impact bar is positioned in said front door with the end facing the rear portion of the vehicle body higher than the opposite end thereof.

4. The structure according to claim 3, wherein a front end of said front impact bar is set at a level corresponding to a level of a bumper of a vehicle colliding against a side of the vehicle.

5. The structure according to claim 1, wherein said front impact bar is inclined at a larger inclination angle than the inclination angle of said rear impact bar, with both of said inclination angles being determined relative to horizontal lines.

6. The structure according to claim 1, wherein said front impact bar is inclined at a smaller inclination angle than the inclination angle of said rear impact bar, with both of said inclination angles being determined relative to horizontal lines.

7. The structure according to claim 1, wherein said front impact bar is substantially horizontally arranged.

8. The structure according to claim 7, wherein a front end of said front impact bar is set at a level corresponding to a level of a bumper of a vehicle colliding against a side of the vehicle.

9. The structure according to claim 1, wherein a rear end of said rear impact bar is terminated above a tire house.

10. The structure according to claim 1, wherein a rear end of said rear impact bar is terminated before a rear fender.

11. The structure according to claim 1, wherein said front impact bar includes a portion extending toward the rear of said vehicle, a rear edge of said extending portion comprising a front hook bent toward a passenger room, said front hook being mounted to engage a front locking member mounted on a center pillar of said vehicle, whereby when said front impact bar is moved toward the passenger room, said front hook will engage said front locking member, and inhibit movement of said front impact bar toward the passenger room.

12. The structure according to claim 11, wherein said locking member is integrally formed on a door hinge plate by bending a portion of the door hinge plate, said door hinge plate being fixed to the center pillar, for rotatably mounting said rear door on the center pillar.

13. The structure according to claim 1, wherein said rear impact bar includes a portion extending toward the rear of said vehicle, a rear edge of said extending portion comprising a rear hook bent toward a passenger room, said rear hook being mounted to engage a rear locking member integrally mounted on a rear fender, whereby when said rear impact bar is moved toward the passenger room, said rear hook will engage said rear locking member, and inhibit movement of said rear impact bar toward the passenger room.

14. The structure according to claim 13, wherein said rear locking member is integrally formed on a seal bracket by bending a portion of said seal bracket, said seal bracket being fixed to the rear fender.

* * * * *

UNITED STATES PATENT AND TRADEMARK OFFICE
CERTIFICATE OF CORRECTION

PATENT NO. : 5,137,325
DATED : August 11, 1992
INVENTOR(S) : Takeji Ohya

It is certified that error appears in the above-identified patent and that said Letters Patent is hereby corrected as shown below:

column 1, line 50:
after "seats" insert --.--;

column 5, line 39:
after "vehicle" insert --.--;

column 5, line 60:
after "vehicle" insert --.--;

column 6, line 55:
after "bar 3" insert --.--;

column 7, line 67:
after "assured" insert --.--;

column 8, line 36:
"door 4" should be --door 2--;

column 9, line 22:
after "FIG. 1" insert --.--.

Signed and Sealed this

Fifth Day of October, 1993

*Attest:*

BRUCE LEHMAN

*Attesting Officer*   *Commissioner of Patents and Trademarks*